United States Patent [19]

Mauron

[11] 4,216,978
[45] Aug. 12, 1980

[54] AUTOMATICALLY POSITIONED SAFETY BELT FOR AN AUTOMOBILE VEHICLE

[75] Inventor: Gerard Mauron, Versailles, France

[73] Assignees: Automobiles Peugeot; Societe Anonyme Automobile Citroen, both of Paris, France

[21] Appl. No.: 952,399

[22] Filed: Oct. 18, 1978

[30] Foreign Application Priority Data

Oct. 21, 1977 [FR] France ................. 77 31768

[51] Int. Cl.² ............................................. B60R 21/10
[52] U.S. Cl. ................................. 280/803; 280/808; 297/483
[58] Field of Search ............... 280/801, 803, 804, 807, 280/808; 297/468, 483

[56] References Cited
U.S. PATENT DOCUMENTS 4,130,253  12/1978  Yasumatsu ................. 280/808 X
4,138,142  2/1979  Wize ................................ 280/803

Primary Examiner—John J. Love
Assistant Examiner—Michael Mar
Attorney, Agent, or Firm—Burns, Doane, Swecker & Mathis

[57] ABSTRACT

The device comprises a first belt portion which extends between a winder mounted on the door of the vehicle and a first belt support mounted on the upper rear part of the door, and a second belt portion forming a cross-belt which extends between the belt support and an anchoring point located substantially in the central part of the vehicle. The second belt portion is extended, in passing through a second belt support constituting the anchoring point, by a third belt portion which constitutes an abdominal belt. An end part of the third belt portion is connected to the first belt portion so as to cause this end part to be raised when the belt is extended upon opening the door.

13 Claims, 6 Drawing Figures

AUTOMATICALLY POSITIONED SAFETY BELT FOR AN AUTOMOBILE VEHICLE

The present invention relates to safety belts or straps for retaining the occupants of an automobile vehicle in the case of an accident, and more particularly concerns safety belts of the so-called passive type which are arranged in such manner that they are placed automatically in their operating position without requiring intervention on the part of the user.

Many arrangements have been proposed to render such safety belt devices passive.

A relatively simple arrangement for a belt associated with an automatic winder, comprises placing the winder adjacent the lower rear part of the door, the belt passing through a member located adjacent the upper rear part of the door and being anchored on the side of the seat opposed to the door. Unfortunately, in this arrangement, the belt does not include a portion which is located in the region of the waist or abdomen of the user.

Now, it is known that, if these devices are to be really effective, they must be of the type having three anchoring points, that is to say they must include both a diagonal portion forming a cross-belt, and an abdominal portion for the lower part of the trunk of the user. In order to render such devices passive, it is then necessary to associate therewith systems which are very complex and expensive so that the user can enter and leave the vehicle easily.

An object of the invention is to provide a particularly effective, simple and cheap device which ensures a correct positioning of the safety belt while it enables the user to enter and leave the vehicle easily when the door of the vehicle is open.

The invention applies to a safety belt device for a passenger of an automobile vehicle, comprising a first portion extending between a winder located on the door and a first belt support located in the upper rear part of the door, and a second portion forming a cross-belt which extends between said belt support and an anchoring point located in a roughly central part of the vehicle. According to the invention, the second portion is extended, in the known manner, in passing round a second belt support constituting said anchoring point, by a third portion which constitutes an abdominal belt having an end part which is connected to the first portion in such manner as to raise said end part under the effect of the extension of the belt when the door is opened.

According to a first embodiment of the invention, the end part of the third portion is directly fixed to the first portion, for example by stitching.

According to a second embodiment of the invention, the end part of the third portion is connected to a second winder carried by the door and third portion passes round a slider which is capable of moving along a slideway carried by the door, this slider being connected to the first portion by a cable or the like.

These two embodiments will be described in the ensuing description with reference to the accompanying drawings in which.

Figure 2:
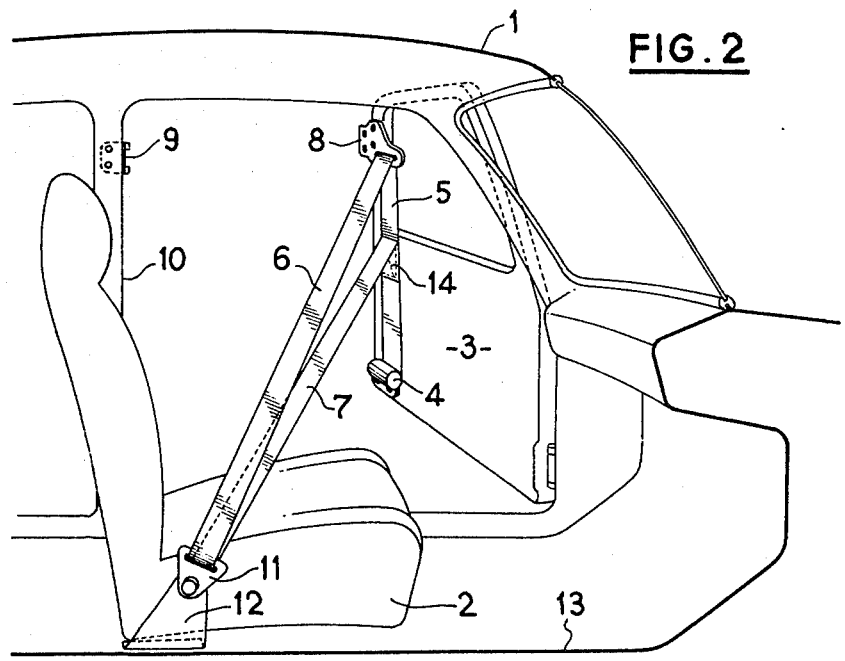
FIGS. 1 and 2 show a first embodiment of the invention the device being shown with the door closed and with the door open respectively.
Figure 1:
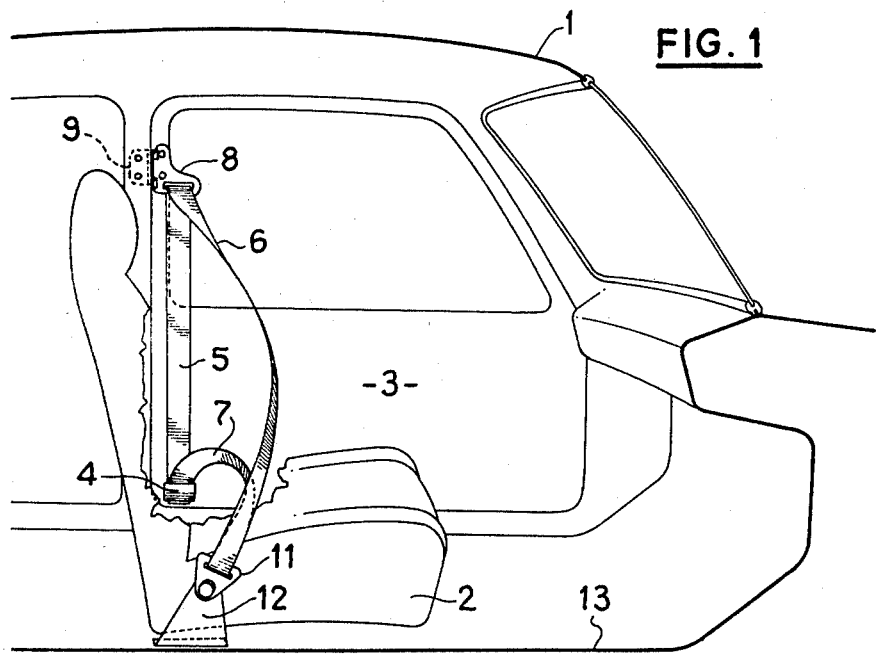

With reference first to FIGS. 1 and 2, there is shown a part of the passenger compartment 1 of an automobile vehicle with a front seat 2 and a door 3 adjacent the seat 2.

A safety device for retaining an occupant of the seat 2 comprises a belt associated with a winder 4. This belt has a first vertical belt portion 5, a second belt portion 6 forming a cross-belt and a third belt portion 7 forming an abdominal part.

The winder 4 is mounted in the lower rear corner of the door 3. The belt passes round a first belt support 8 mounted on the rear edge of the door 3 and associated, in the known manner, with an anchoring member 9 which is fixed to a pillar 10 of the body. It also passes round a second belt support 11 fixed to a bracket 12 which is rigid with the seat 2. This bracket could just as well be rigid with the floor 13 of the vehicle.

The end part 14 of the third portion 7 of the belt is fixed, for example by stitching, to the first portion 5, so that the fixing point is located roughly half-way up the door 3 when the latter is open (FIG. 2).

In normal use, the device operates in the following manner:

With the door 3 open (FIG. 2), the belt support 8 and the end parts of the portions 6 and 7 are offset forwardly, the end part 14 of the portion 7 being moreover raised. It is now possible to either enter the vehicle or leave the vehicle without hinderance. It will be in particular observed that the raising of the connection 14 between the portions 5 and 7 which have been limited by design, permits the occupant to pass normally, between these two portions, his arm which corresponds to the shoulder which must be positioned under the portion 6 forming the cross-belt.

When the door is closed, the vertical portion 5 of the belt is wound up in the winder 4 and pulls the end part of the abdominal belt 7 downwardly, a part of the latter entering the winder together with the portion 5. When the door 3 is in the closed position, the safety belt is similar to a conventional safety belt having three anchoring points (FIG. 1).

The opening of the door produces the reverse movement.

Figure 4:
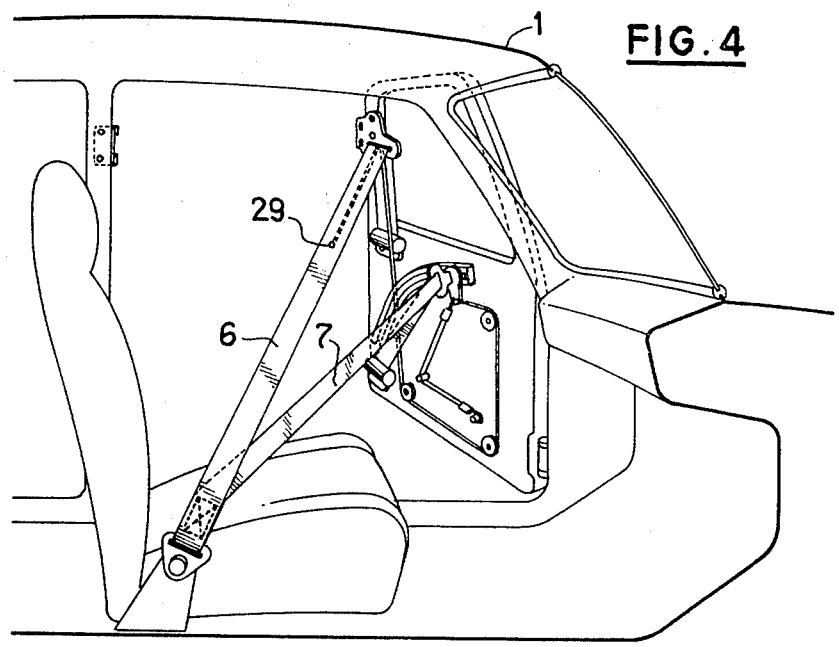
FIGS. 3 and 4 are views similar to FIGS. 1 and 2 in respect of a second embodiment of the invention.
Figure 3:
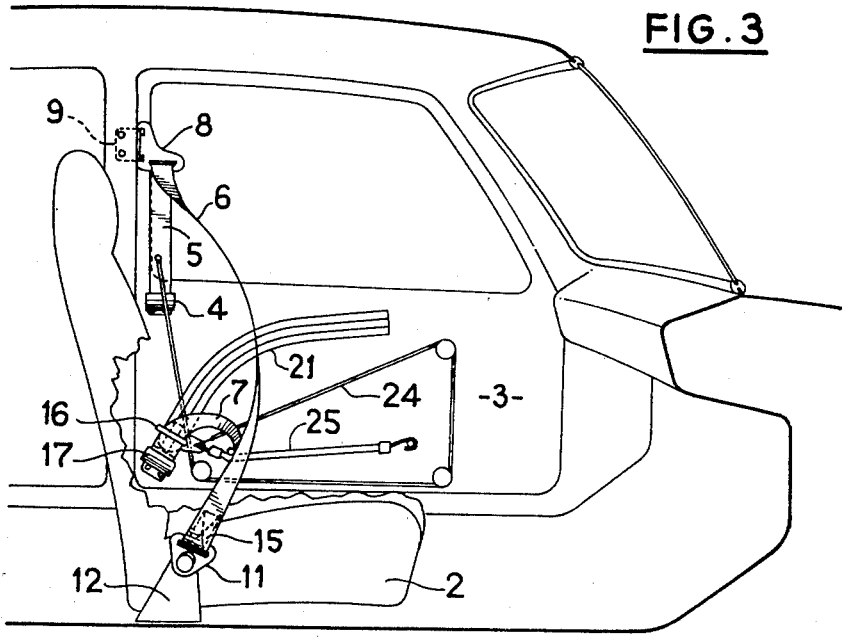

In the embodiment shown in FIGS. 3 and 4, the safety belt comprises the same elements 4 to 12 as in the first embodiment.

The winder 4 is mounted in the vicinity of the rear edge of the door 3 roughly half-way up the latter so as to allow the lower part of the door free.

The belt portions 6 and 7 are interconnected on each side of the belt support 11, for example by stitching 15, so as to avoid any sliding in the region of this belt support.

The end part of the abdominal belt 7 passes through a buckle or loop 16 and enters a winder 17 which is mounted in the lower rear corner of the door 3. The loop 16 is mounted on a base 18 which is fixed to a spigot 19 carried by a slider 20 which is slidable in a slideway 21 fixed on the inner side of the door 3. The slideway has a generally curved shape and extends from the region of the winder 17 to a point located in the forward and upper part of the door panel. The slideway has a slot 21a through which the spigot 19 passes.

Figure 6:
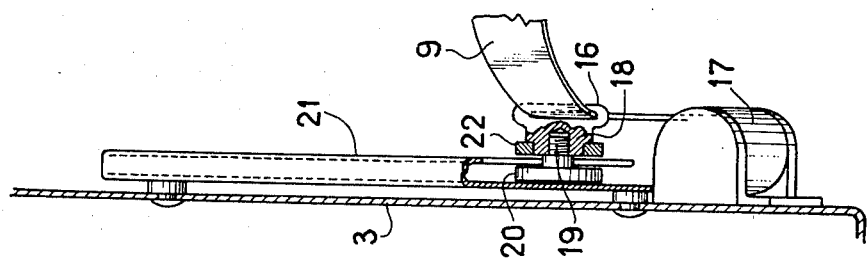
FIG. 6 is a side elevational view of the detail shown in FIG. 5.
Figure 5:
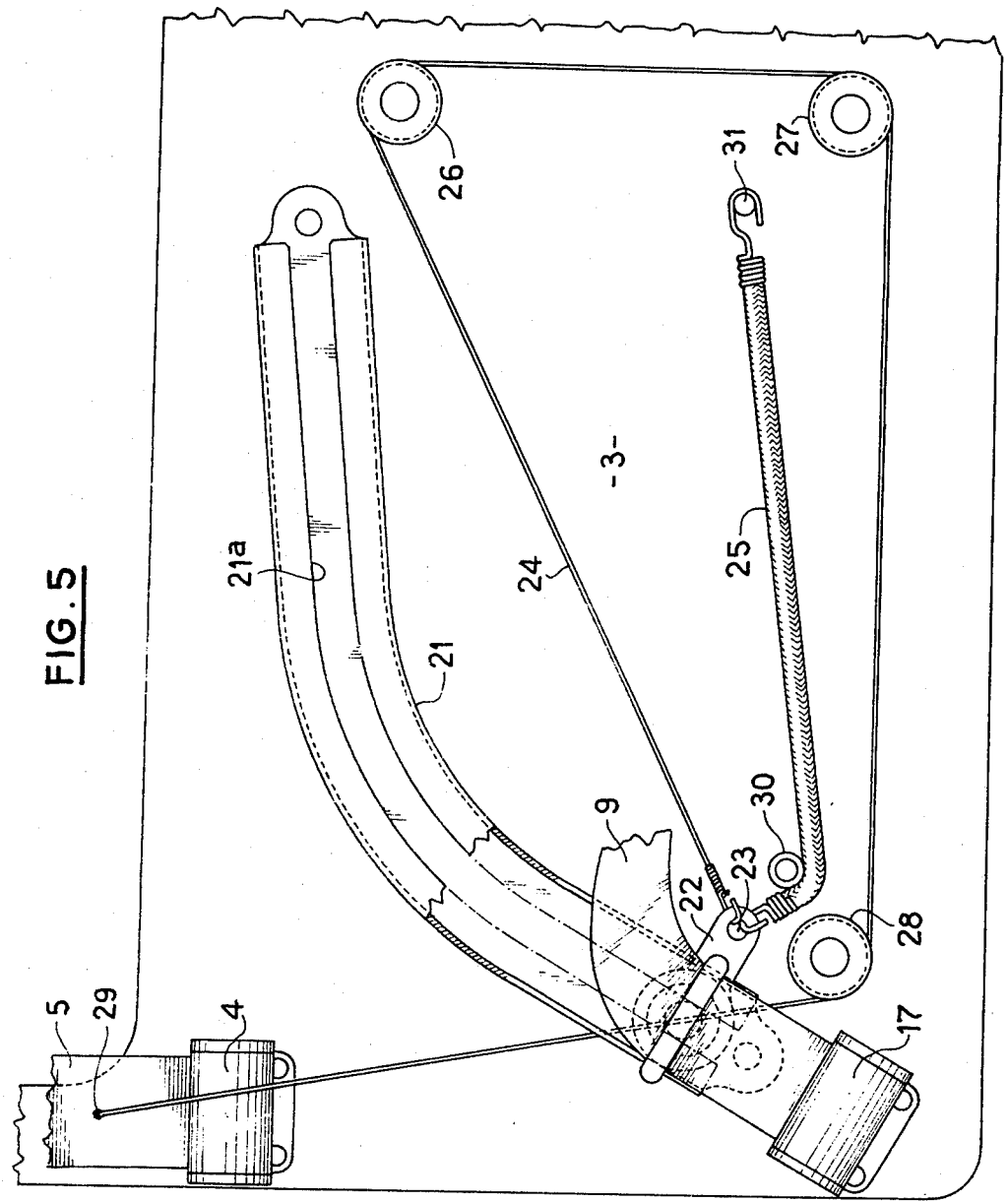
FIG. 5 represents a detail to an enlarged scale of the embodiment shown in FIG. 3.

A plate 22 is freely rotatively mounted on the base 18 of the loop 16. This plate has an aperture 23 in which are engaged the end of a cable 24 and the end of an elastically yieldable return means formed in the presently described embodiment by a "Sandow" elastic member 25 (FIGS. 5 and 6). The cable 24 extends around three pulleys 26, 27, 28 mounted on the door and is hooked at 29 to the portion 5 of the safety belt, slightly above the winder 4 when the safety belt is in its position of use when the door is closed (FIG. 3). The element 25 extends around a support 30 and is hooked to a lug 31 located in the front part of the door.

The device just described operates in the following manner:

With the door closed, the belt portion 5 is wound up to the full extent in the winder 4 and the belt portion 7 is wound up to the full extent in the winder 17. The elastic element 25 is at its shortest and the loop 16 is located near the end of the slideway 21 in the vicinity of the winder 17. The safety belt is then in the form of a conventional safety belt having three anchoring points.

When the door is opened, the belt portions 6 and 7 are lengthened by respectively unwinding from the winders 4 and 17. The hooking point 29 of the cable 24 rises with the portion 5 and possibly travels around the belt support 8. This movement shifts the loop 16 toward the upper front part of the slideway 21 and puts the elastic element 25 under tension.

The closing of the door produces a reverse movement and the elastic element 25 returns the loop 16 to its lower position.

This second embodiment has the following advantages over the first embodiment:

In the position corresponding to an open door, the abdominal belt portion clears the entrance better owing to the forward displacement of the loop 16.

Owing to the connection 15 between the belt portions 6 and 7 in the region of the belt support 11, there is practically no rubbing on the clothes of the occupant of the seat in the course of opening and closing the door.

Of course, the door panel has a cover which hides the mechanism carried by the door, the sole part being visible being formed by the slot 21a of the slideway 21. Although this has not been mentioned in the foregoing description, it will be clear that the winders are of the type comprising means incorporated therein for blocking the belt, which means come into action as soon as the belt is subjected to a sudden pull, in the event of a sudden braking or a shock for example. These blocking means are conventional in the art and have not been illustrated.

Having now described my invention, what I claim as new and desire to secure by Letters Patent is:

1. A safety belt device for retaining a passenger of an automobile vehicle on a seat of the vehicle, said device comprising a door of the vehicle, a safety belt having a first belt portion, a second belt portion and a third belt portion, a belt winder mounted on the door, a first belt support mounted on the door in an upper rear part of the door, a second belt support constituting an anchoring member located substantially in a central part of the vehicle and fixed relative to the seat, the first belt portion extending between the winder and the first belt support, the second belt portion forming a cross-belt extending between the first belt support and the second belt support, and the second belt portion being extended, in passing round the second belt support, by the third belt portion which constitutes an abdominal belt and has an end part which is connected to the first belt portion so as to cause said end part to be raised under the effect of the extension of the belt when the door is opened.

2. A device as claimed in claim 1, wherein the end part of the third belt portion is directly fixed to the first belt portion.

3. A device as claimed in claim 2, wherein the winder is placed in a lower corner of the door and the third belt portion is fixed to the first belt portion at such level that when the door is opened, said end part is raised to a position substantially half-way up the door.

4. A device as claimed in claim 2 or 3, wherein the second belt portion and the third belt portion extend freely through the second belt support.

5. A device as claimed in claim 1, comprising a second winder mounted on the door, a slideway mounted on the door, a slider unit slidebly mounted on the slideway and means connecting the first belt portion to the slider unit, the end part of the third belt portion being connected to the second winder and the third belt portion passing through the slider unit.

6. A device as claimed in claim 5, wherein the connecting means comprise a cable.

7. A device as claimed in claim 5, wherein the first winder is located in the vicinity of a rear edge of the door substantially half-way up the door and the second winder is located in a lower rear corner of the door.

8. A device as claimed in claim 7, wherein the slider unit comprises a shoe member slidable in the slideway, a base fixed to the shoe member and means defining a loop which is rigid with the base.

9. A device as claimed in claim 7 or 8, comprising a support mounted on the door and an elastically yieldable means which extends round the support mounted on the door and is connected to the slider unit for returning the slider unit to a lower position.

10. A device as claimed in claim 9, comprising a plate which is freely rotatively mounted on the base to which plate the elastically yieldable means is hooked.

11. A device as claimed in claim 6, comprising pulleys mounted on the door, around which pulleys the cable passes before being connected to the first belt portion.

12. A device as claimed in claim 5, wherein the slideway is curved and extends upwardly and forwardly of the door.

13. A device as claimed in claim 5, wherein the second and third belt portions are fixed to each other in the vicinity of the second belt support.

* * * * *